Patented June 8, 1954

2,680,735

UNITED STATES PATENT OFFICE 2,680,735

RESINOUS ESTERS OF ACRYLIC ACID AND METHACRYLIC ACID

Virginia W. Fegley and Stanley P. Rowland, Philadelphia, Pa., assignors to Rohm & Haas Company, Philadelphia, Pa., a corporation of Delaware No Drawing. Application July 9, 1952,
Serial No. 298,008

18 Claims. (Cl. 260—86.1)

This invention relates to polymerizable esters of acrylic and methacrylic acid and to the polymers and copolymers thereof. It relates to esters which are readily polymerized to linear, thermoplastic resins which resins in turn are convertible to cross-linked resins by the application of heat.

The monomeric esters of this invention have the general formula

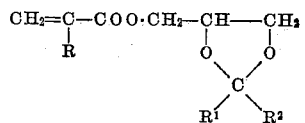

in which R represents a hydrogen atom or a methyl group and $R^1$ and $R^2$ each represents a hydrogen atom or a hydrocarbon radical, preferably an alkyl group. These esters polymerize very readily to form linear, thermoplastic polymers which have the following general formula in which R, $R^1$ and $R^2$ are identical with the same characters described above:

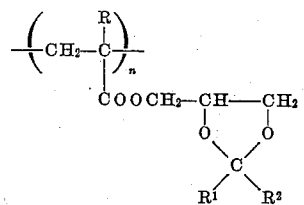

The linear, thermoplastic polymers in turn are heat-convertible and can be changed into cross-linked polymers which for practical purposes have the properties of thermoset resins. This is possible because the cyclic portions of the molecules—the dioxolane groups—can be made to open under the effect of heat and/or a catalyst and to provide cross-linkages according to the following representation:

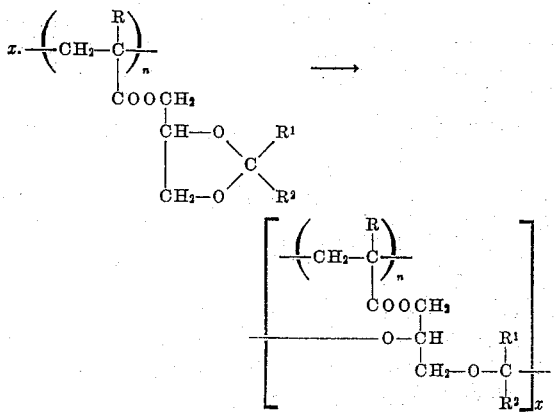

The monomeric products of this invention are preferably made from an ester of acrylic acid or methacrylic acid and a 4-hydroxymethyl-dioxolane according to the following general reaction by transesterification or ester-interchange:

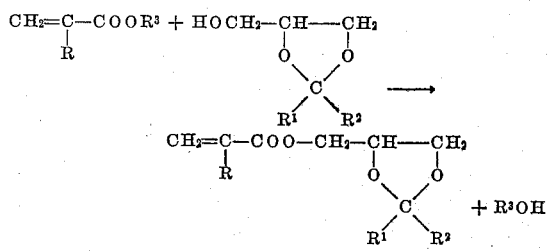

In the above equation $R^3$ represents a hydrocarbon group, preferably an alkyl group of one to four carbon atoms. The group represented by $R^3$ can be a hydrocarbon group of higher molecular weights; e. g., a phenyl or a cyclohexyl or an amyl group, but the processes employing such esters of methacrylic acid are less efficient and costlier. What is actually recommended is the use of methyl or ethyl methacrylate.

The other reactant, a 4-hydroxymethyldi-oxolane, having the formula

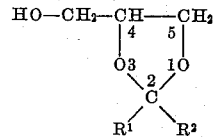

is readily prepared in good yields by the reaction of an aldehyde or ketone with glycerol (J. Am. Chem. Soc. 67, p. 1621 (1945); J. Org. Chem. 14, p. 1103 (1949)). Thus, the dioxolane from glycerol and formaldehyde has the formula

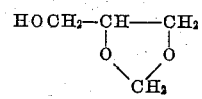

(Here $R^1$ and $R^2$ are hydrogen atoms.) The products from other aldehydes, $R^2CHO$, such as acetaldehyde, butyraldehyde, or benzaldehyde have the formula

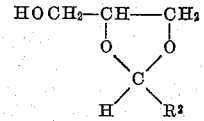

wherein $R^2$ is a hydrocarbon radical such as the methyl, propyl, or phenyl radical of the aldehyde. When ketones, $R^1$—CO—$R^2$, such as acetone, methyl ethyl ketone, methyl cyclohexyl ketone, or acetophenone, are used, the dioxolanes have the general formula

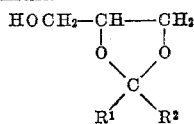

wherein $R^1$ and $R^2$ are the same hydrocarbon groups as were present in the ketone. All of these reactants are 4-hydroxymethyldioxolanes which differ in structure one from the other only as regards the $R^1$ and $R^2$ substituents on the carbon atom at position 2. Of these, 2,2-dimethyl-4-hydroxymethyldioxolane is the compound of first choice because the resins made therefrom are particularly hard and have high heat-distortion temperatures. Keeping the end-products in mind, it is recommended that the total number of carbon atoms in the groups which are represented by $R^1$ and $R^2$ be twelve or less. Thus, for example, when $R^1$ is a hydrogen atom, $R^2$ can be any hydrocarbon group, free of nonbenzenoid or aliphatic unsaturation, up to the dodecyl group; or when $R^1$ is a butyl group, $R^2$ can contain up to eight carbon atoms, as in the phenyl, tolyl, or octyl groups.

The transesterification reaction shown above is carried out at elevated temperatures, preferably at a pot-temperature from about 70° C. to the boiling point of the reaction mixture, so that the alcohol, $R^3OH$, which is formed can be removed by distillation as the reaction progresses. In this way the reaction proceeds rapidly to substantial completion. Temperatures below the boiling point of the reaction mixture can be used, but the reaction reaches equilibrium, and the yield is consequently lower, if the alcohol, $R^3OH$, is not removed as it is formed. The use of alkali metal alkoxides as activators and accelerators in the transesterification reaction is recommended. Sodium methylate and ethylate are particularly recommended. Reduced pressures can also be employed.

While the ester of acrylic or methacrylic acid and the 4-hydroxymethyldioxolane react in equimolar amounts, it is preferred to use an excess of the former. Such an excess is easily removed from the reaction product by distillation. In fact, some of the original acrylic or methacrylic acid ester frequently distills over with the liberated alcohol as a binary mixture. Finally, the product is purified by distillation, preferably under reduced pressure.

Because the products polymerize readily, it is recommended that an inhibitor be present during their preparation and particularly during the distillation of the materials. Suitable inhibitors are those customarily used to stabilize monomeric materials containing a vinylidene group, $$CH_2=C<$$

including di-beta-naphthol, hydroquinone, tert.-butyl catechol, pyrogallol and the like.

Alternatively, the products of this invention can be made by the direct esterification of acrylic acid, methacrylic acid, or the anhydrides thereof with a 4-hydroxymethyldioxolane.

The monomeric esters of this invention polymerize at temperatures as low as 0° C., and in the neighborhood of 200° C. they polymerize rapidly even though they may contain customary amounts of inhibitor. Polymerization is accelerated by the use of free-radical catalysts such as the following in amounts from 0.01% to 5%, and preferably from 0.02% to 2%, based on the weight of the polymerizable compounds: Benzoyl peroxide, acetyl peroxide, lauroyl peroxide, tert.-butyl hydroperoxide, di-tert.-butyl peroxide, tert.-butyl perbenzoate, stearoyl peroxide, ascaridol, cumene hydroperoxide, "per-salts" such as ammonium persulfate, and the like. The polymers can also be made under the influence of ultra-violet light and a catalyst such as benzoin.

Polymerization can take place in bulk, in solution, in suspension, or in emulsion. Consequently, the thermoplastic polymers can be obtained in the form of sheets, blocks, rods, slabs, powders, pellets, or beads, all of which can be molded into a variety of shapes and forms by conventional molding techniques. Furthermore, the solutions and emulsions of the polymers are very useful as surface coatings for metal, leather, wood and the like as well as for the treatment of fabrics. After their application the films of resin can be cross-linked and insolubilized by a heat-treatment.

The monomeric esters of this invention are also copolymerizable with other compounds which contain at least one vinylidene group, $CH_2=C<$. And when they are thus copolymerized, they impart to the resultant copolymers the ability to change under the influence of heat to cross-linked resins having enhanced resistance to chemicals and solvents. Compounds which can thus be copolymerized are exemplified by the following: Acrylic and methacrylic esters such as methyl methacrylate, ethyl acrylate, octyl acrylates, and benzyl acrylate; vinyl esters such as vinyl acetate and propionate; vinyl chloride; vinylidene chloride; acrylonitrile; allyl esters such as diallyl phthalate and diallyl succinate; vinyl hydrocarbons such as styrene, divinylbenzene, and vinylnaphthalene; and maleic anhydride. Copolymers containing mixtures of two or more of the compounds containing the vinylidene group $CH_2=C<$ are also embraced by the invention. The above list is by no means exhaustive and reference is made to U. S. Patent No. 2,578,861 wherein are listed a great number of compounds containing the group $CH_2=C<$ which can be copolymerized with the products of this invention either individually or as mixtures of two or more.

To date, the most useful copolymers are those which include either maleic anhydride or an alkyl ester of acrylic or methacrylic acid containing one to eighteen carbon atoms in the alkyl group. The maleic anhydride copolymers are particularly valuable because they react with azolines according to the process of U. S. Patent No. 2,543,602 to form linear, polymeric imidoesters which can be subsequently cross-linked by treatment with heat and a catalyst. The esters of acrylic and methacrylic acids mentioned above constitute a preferred class of materials which are copolymerizable with the esters of this invention. This is because the resultant copolymers are colorless and can be used in the form of solutions as surface-coatings, in the form of molding powders for the production of molded articles and in the form of sheets for the manufacture of signs and aircraft enclosures. All of the finished articles from the copolymers can be cross-linked and, accordingly, they have real advantages over the linear polymers of the same acrylic or methacrylic esters alone.

Because the simple alkyl esters of acrylic and methacrylic acid are copolymerizable with the dioxolone esters of this invention, it is evident that any reasonable amount of the simple ester which may be present at the end of the transesterification reaction, by which the products of this invention are made, will not interfere with the polymerization of the latter.

In the formation of copolymers it has been found desirable to have at least 10%, and preferably 20%, on a molar basis, of the dioxolane ester so that there are present a sufficient number of the dioxolane units to bring about effective cross-linking. Copolymers containing from 10% to 90% of the new esters of this invention and 90% to 10% of a copolymerizable compound containing a vinylidene group, $CH_2=C<$, are outstanding in their properties and are embraced by this invention.

It is also within the scope of this invention to include dyes, pigments, release agents, extenders, fillers, and the like in the polymerization of the new monomers. In this way, colored and transparent, or colored and translucent, or colored and opaque products can be made which enjoy the same advantages as the crystal-clear materials.

The thermoplastic, linear polymers, while in any shape or form, can be cross-linked by means of heat and/or by a catalyst of the acidic or Friedel-Crafts type. Typical of the suitable catalysts are the following: Boron trifluoride and its complexes with ethers, acids, and alcohols, ethyl sulfate, alkyl acid phosphates, p-toluenesulfonic acid, titanium tetrachloride, stannic chloride, and the like. The resultant products are characterized by having far greater resistance to solvents than the original linear polymers and by having a higher softening point. The advantage of heating the resins in order to cross-link them is most evident in those cases where the resins are laid down in the form of films from solutions or emulsions and are then heated. As a result of the heating and cross-linking, the films acquire hardness and a much enhanced resistance to organic solvents and chemicals.

The following examples, in which all parts are by weight, serve to illustrate the preparation and polymerization of the new monomeric esters.

*Example 1*

In a one-liter distilling flask, fitted with a packed column and a partial take-off head, was placed 132.2 grams (one mole) of isopropylideneglycerol, or 2,2-dimethyl-4-hydroxymethyl-dioxolane, of the formula

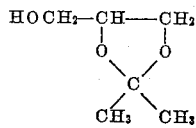

together with 500.5 grams of methyl methacrylate (5 moles) and 5 grams of di-beta-naphthol. Fourteen grams of a solution of 2 grams of sodium in 40 grams of methanol was added. The mixture was heated slowly to a vapor temperature of 64.2° C. and a binary distillate of methanol and methyl methacrylate was removed. Twenty-eight grams of the catalyst mixture was added in three portions over a period of 13 hours, at which point the calculated amount of binary distillate was removed and collected. The excess methyl methacrylate was then removed by distillation at reduced pressures. The isopropylideneglyceryl methacrylate,

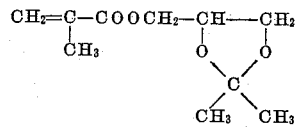

was then collected between 68° and 70° C. at a pressure of 0.8-1 mm. It weighed 180.4 grams and represented a 90.3% yield. This product was redistilled and the following properties were determined:

$N_D^{20}$: 1.442
$d_{20}^{20}$: 1.1924
Saponification number: 278 (calculated 280.5)
Solubility: Soluble in acetone, butyl acetate, ethylene dichloride, toluene and dioxane. Insoluble in ethanol and water.

*Example 2*

The monomeric ester of Example 1 was polymerized in solution as follows: 250 parts by weight of the isopropylidene-glyceryl methacrylate was dissolved in 250 parts by weight of toluene and 7.5 parts (3%) of benzoyl peroxide in a flask equipped with a gas-inlet tube, thermometer, agitator, and reflux condenser. Carbon dioxide was bubbled through the stirred solution throughout the entire heating period. The mixture was heated to refluxing temperature and held for three hours. Then 2.5 parts (1%) of benzoyl peroxide was added after which heating at the refluxing temperature was continued for two more hours. Another portion of 2.5 parts of benzoyl peroxide was added at this time and the heating was continued for an additional period of five hours. By this time 99.4% of the monomer had polymerized to a viscous solution having a viscosity when measured at 40% solids in toluene of 2.5 poises at 25° C.

This solution was divided and a portion of it was treated with a 10% solution of boron trifluoride in diethyl ether in such an amount as to provide 1% of the catalyst based on the weight of the polymer. Films of the catalyzed and uncatalyzed solutions were made by flowing the solution on glass. The films were air-dried or baked and the dried films were tested for hardness (on the pencil hardness scale) and for resistance to solvent (by measuring the number of strokes before failure with a pad saturated with acetone). Following is a tabulation of the results showing the improvement which results from cross-linking the polymer:

| Catalyst | Treatment | Pencil-Hardness | Acetone-Resistance | Clarity |
| --- | --- | --- | --- | --- |
| None | Dried in air 24 hours | 5B | 5-8 | Perfectly Clear. |
| Do | ½ hour at 150° C | H | 50 | Do. |
| 1% BF₃-ether | Dried in air 24 hours | F | 120 | Do. |
| Do | ½ hour at 150° C | 2H | over 150 | Do. |

*Example 3*

A sheet of polymeric isopropylideneglyceryl methacrylate was cast as follows: The monomeric ester prepared by the process of Example 1 above and containing 0.05% of benzoyl peroxide and a small amount of release agent was heated in a flask at 60° C. under reduced pressure until all occluded, extraneous gases were removed. After this degassing operation the liquid was poured into a cell made of two pieces of plate glass (12″ x 12″) sealed at the edges by flexible spacers. The filled cell was sealed in order to exclude air and was placed in an oven having automatic control of temperature, where it was heated at 60° C. for 16 hours followed by a one-hour period of heating at 70° C., 80° C., 90° C., 100° C., and 110° C. At this point polymerization was essentially complete and the product obtained was a clear, colorless sheet of polymer which had about the same appearance, hardness and abrasion-resistance of a sheet of polymerized methyl methacrylate but which was insoluble in acetone and toluene whereas a comparable sheet of polymethyl methacrylate dissolved completely.

*Example 4*

A. A film-forming solution of a copolymer of 30% methyl acrylate and 70% isopropylideneglyceryl methacrylate was made as follows: Into a three-necked flask, equipped with thermometer, mechanical stirrer, gas-inlet tube and reflux condenser were charged 700 parts of isopropylideneglyceryl methacrylate as prepared by the process of Example 1 above, 129 parts of methyl acrylate, 829 parts of toluene and 8.3 parts of benzoyl peroxide (1% based on monomeric compounds). Nitrogen was bubbled through the stirred solution throughout the following heating schedule. The solution was heated to 90° C. and held there for 18 hours. Portions of benzoyl peroxide (1.6 parts equivalent to 0.2%) were added at the end of the fifth, sixth, and seventh hours. The product was a crystal-clear solution having a viscosity of 275 poises when diluted to 40% solids-content with toluene and measured at 25° C.

B. Another film-forming solution in xylene was made in the same way by the polymerization of a mixture of equimolar amounts of styrene and isopropylideneglyceryl methacrylate. The resultant product had a viscosity of 1.65 poises when measured as a 40% solution in xylene at 25° C.

The character of the films of these two polymers is indicated in the following tabulation where "Ex-4A" indicates the product described in part A of Example 4 and "Ex-4B" indicates the product described in part B of Example 4.

toluene at 25° C. The product obtained by carrying out the copolymerization in xylene had a viscosity of 98 poises when measured as a 40% solution in xylene at 25° C. Both solutions were clear and substantially colorless and both dried to clear, colorless films when air-dried. On being baked, the films increased in their resistance to solvents—particularly to acetone.

*Example 6*

An emulsion of a copolymer was made in the following manner: Forty parts of ethyl acrylate, 45 parts of isopropylideneglyceryl methacrylate, 45 parts of water, and 83 parts of a 20% aqueous solution of a commercially available emulsifying agent (TRITON 773, sold by Rohm & Haas Company, Philadelphia, Pa. and known to be the sodium salt of alkylphenoxyethyl sulfate) was vigorously stirred and heated under a blanket of carbon dioxide. As catalyst there was added 0.019 part of ammonium persulfate; and the emulsion was heated for 24 hours at 50°–60° C. A 96.4% conversion of monomers to copolymer resulted. When the resultant emulsion was applied to a surface and was dried, it deposited a clear film which was readily soluble in acetone. Heating of the film for one-half hour at 150° C. greatly increased the resistance to acetone.

*Example 7*

Isopropylideneglyceryl acrylate was prepared by reacting 1.25 moles of acrylic anhydride with 1.0 mole of isopropylideneglycerol, or 2,2-dimethyl-4-hydroxymethyldioxolane, for a week at room temperature in the presence of 1%, based on the acrylic anhydride, of hydroquinone and 5 moles of pyridine. At the end of this time the upper phase was removed and distilled. The product, whose structure was confirmed by analysis, boiled at 76°–77° C./3.0–3.5 mm.

It had a saponification number of 300 (calculated value is 301.5), a refractive index at 20° C. of 1.4399, a density at 20° C. of 1.068, and was soluble in acetone, butyl acetate, ethylene dichloride, toluene, dioxane and ethanol, but was insoluble in water.

*Example 8*

A polymer of the product of Example 7 was made by heating 21.5 parts of the material, while dissolved together with 0.11 part of benzoyl peroxide in 10.75 parts of methylisobutyl ketone,

| Copolymer | Catalyst | Treatment | Pencil-Hardness | Acetone-Resistance |
|---|---|---|---|---|
| Ex-4A | None | Dried in air 24 hours | 4B | 8. |
| Ex-4A | 1% BF₃-ether | do | 3B | 30–35. |
| Ex-4A | 1% p-toluene sulfonic acid. | do | B | about 90. |
| Ex-4A | None | ½ hr. at 150° C | 2H | 20. |
| Ex-4A | 1% BF₃-ether | do | 4H | over 150. |
| Ex-4A | 1% p-toluene sulfonic acid. | do | 2H | Do. |
| Ex-4B | None | do | 2H | 25. |
| Ex-4B | 1% BF₃-ether | do | 3H | about 100. |

*Example 5*

Terpolymers were made from mixtures containing 0.9 mole of ethyl methacrylate, 0.1 mole of isopropylideneglyceryl methacrylate, and 0.25 mole of maleic anhydride by polymerizing the mixture in the presence of 0.55% of benzoyl peroxide at 80° C. over a period of 12 hours by the general method described in Example 4 above. In one case the solvent was toluene and the resinous product attained a viscosity of 14 poises when measured as a solids-content of 40% in at 90°–100° C. The reaction product was further diluted to a solids-content of 50% with 10.74 parts of methylisobutyl ketone. Evaporation of a portion of the solution showed that polymerization was 95% complete. The 50% solution was clear and colorless and had a viscosity of 18 poises at 25° C.

A film of the solution was baked at 150° C. for 30 minutes and the resultant dried film was found to be clear, colorless, tack-free, hard, and resistant to organic solvents.

Example 9

Methyl methacrylate and the product of Example 7 were mixed in equal weights and catalyzed with 0.5% of benzoyl peroxide. After de-aeration of the mixture it was placed in a glass cell like that described above in Example 3 and was heated 60 hours at 60° C. and one hour each at 60° C., 70° C., 80° C., 90° C., 100° C., and 110° C. The cooled casting was perfectly clear, colorless, tack-free, and flexible. Samples of the casting were not dissolved in 24 hours by acetone, ethylene dichloride, toluene or ethanol. The casting was stiff but not brittle at 0° C. and at 150° C. was soft and pliable but not tacky. Upon being heated at 150° C. for 40 minutes the casting cured further and became rigid.

Example 10

In a similar manner to that described in Example 8 a mixture of equal weights of styrene and isopropylideneglyceryl acrylate was polymerized at 50% concentration in toluene with 0.2% of benzoyl peroxide. The resultant solution was clear and colorless and had a viscosity of 28 poises at 25° C. This solution gelled slowly at room temperature upon the addition of catalytic amounts of boron trifluoride.

While the above examples are drawn to the preparation and use of isopropylidene acrylate and methacrylate, because these are the preferred products of this invention, it is to be understood, however, that the processes of the examples are those which are successful for the preparation of the other monomers of the general formula

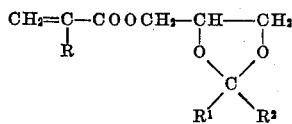

described above, and for the preparation of polymers and copolymers thereof.

We claim:

1. A polymerizable ester represented by the general formula

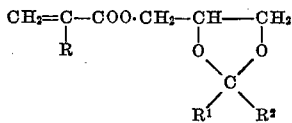

wherein R represents a member of the class consisting of a hydrogen atom and a methyl group and $R^1$ and $R^2$ each represents a member of the class consisting of a hydrogen atom and alkyl, cycloalkyl and aryl radicals which contain one to twelve carbon atoms, the total number of carbon atoms in said alkyl, cycloalkyl and aryl radicals represented by $R^1$ and $R^2$ being from one to twelve.

2. A polymerizable ester represented by the formula

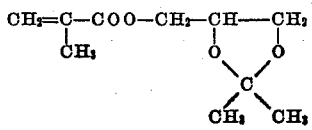

3. A polymerizable ester represented by the formula

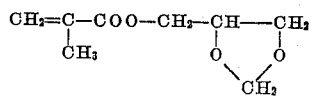

4. A polymerizable ester represented by the formula

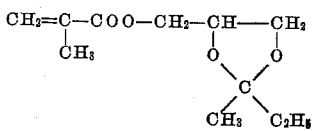

5. A polymerizable ester represented by the formula

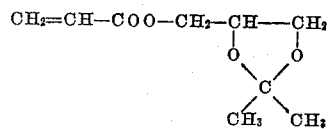

6. A polymerizable ester represented by the formula

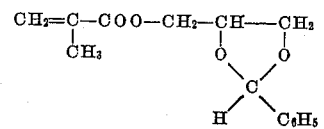

7. A polymer of an ester of claim 1.
8. A polymer of the ester of claim 2.
9. A polymer of the ester of claim 3.
10. A polymer of the ester of claim 4.
11. A polymer of the ester of claim 5.
12. A polymer of the ester of claim 6.
13. A copolymer of an ester of claim 1 and another copolymerizable monomeric compound which contains a vinylidene group, $CH_2=C<$, said ester being present to an extent of at least 10%.
14. A copolymer of the ester of claim 2 and another copolymerizable monomeric compound which contains a vinylidene group, $CH_2=C<$, said ester being present to an extent of at least 10%.
15. A copolymer of the ester of claim 3 and another copolymerizable monomeric compound which contains a vinylidene group, $CH_2=C<$, said ester being present to an extent of at least 10%.
16. A copolymer of the ester of claim 4 and another copolymerizable monomeric compound which contains a vinylidene group, $CH_2=C<$, said ester being present to an extent of at least 10%.
17. A copolymer of the ester of claim 5 and another copolymerizable monomeric compound which contains a vinylidene group, $CH_2=C<$, said ester being present to an extent of at least 10%.
18. A copolymer of the ester of claim 6 and another copolymerizable monomeric compound which contains a vinylidene group, $CH_2=C<$, said ester being present to an extent of at least 10%.

References Cited in the file of this patent

UNITED STATES PATENTS

| Number | Name | Date |
|---|---|---|
| 2,312,298 | Marple | Feb. 23, 1943 |
| 2,382,640 | Kenyon | Aug. 14, 1945 |